Nov. 24, 1964     A. J. SCHUTZ     3,158,725
WELDABLE ELECTRIC CONTACT WITH READILY
DISCERNABLE IMPROVED WELDING FACE
Filed Dec. 26, 1962

INVENTOR.
ALFRED J. SCHUTZ

BY
Brown, Critchlow, Flick & Peckham
his ATTORNEYS.

United States Patent Office 3,158,725
Patented Nov. 24, 1964

3,158,725
WELDABLE ELECTRIC CONTACT WITH READILY DISCERNABLE IMPROVED WELDING FACE
Alfred J. Schutz, St. Marys, Pa., assignor to Stackpole Carbon Company, St. Marys, Pa., a corporation of Pennsylvania
Filed Dec. 26, 1962, Ser. No. 248,181
2 Claims. (Cl. 200—166)

This invention relates to electric contacts that are welded to conducting supports.

Electric contacts are furnished in great quantities for welding to various supports, such as circuit breaker arms, relays, vibrator reeds, etc. To facilitate welding, it is common practice for the manufacturer of such contacts to furnish them with a layer of silver solder on the back, but since the color of the solder is generally the same as the color of the contact face of the contact, it is difficult for the welder to be sure that the solder side of the contact is next to the support when he welds the two together. If the wrong side of the contact is welded, a good connection is not made and the contact will come loose. Attempts to solve this problem by marking the solder sides of the contacts with an identifying symbol have not been very successful.

It is an object of this invention to provide a weldable electric contact, which carries a layer of silver solder provided with a face having a color that is readily distinguishable from the contact face of the contact.

Figure 1:
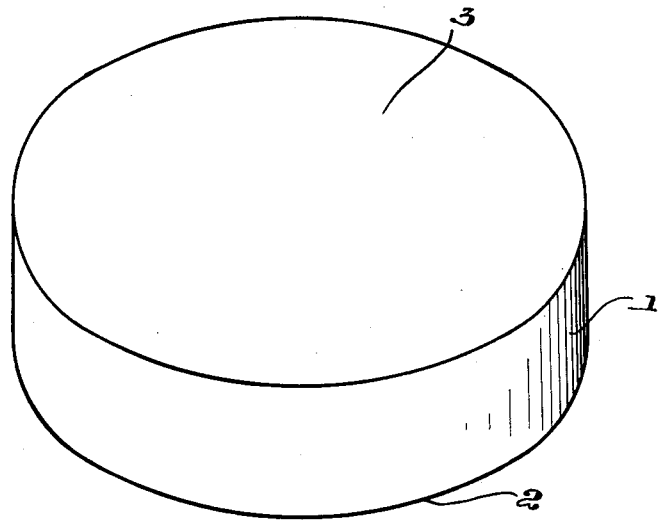
Figure 2:
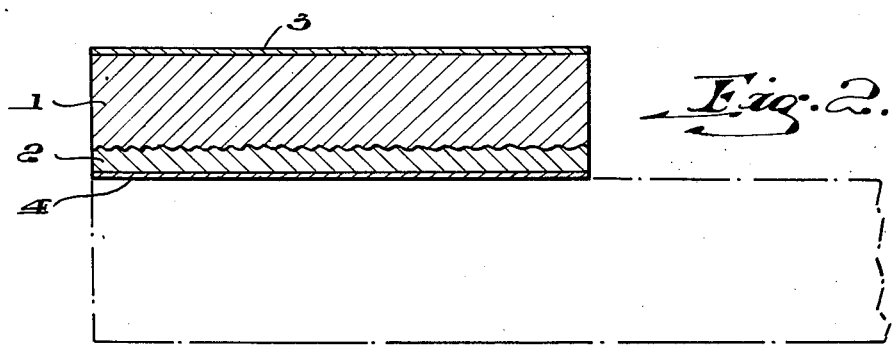

The preferred embodiment of the invention is illustrated in the accompanying drawing, in which FIG. 1 is an enlarged perspective view of my electric contact; and FIG. 2 is a cross section of the contact.

Referring to the drawings, the contact may have any desired shape, such as rectangular or round. The one shown is round and is formed from a body or disc 1 having a back, to which a very thin layer 2 of silver solder has been applied in any suitable manner. The disc generally is made from a silver alloy, such as silver-tungsten or silver-molybdenum, whereby the entire disc will have a silver color. If the disc is not made from a silver-colored material, at least its contact face will be silver color, due to the application to the disc of a film 3 of silver or nickel. The film or plating of silver often is applied even when the disc is made of silver alloy.

The natural color of the silver solder which is a brazing solder, is silver and therefore it normally would be indistinguishable from the contact disc. One example of a very suitable silver solder is one made from an alloy of approximately 80 parts of copper, 15 parts of silver and 5 parts of phosphorous. The solder is applied to the back of the disc in any well-known manner.

It is a feature of this invention that in spite of the use of a silver solder on a contact disc having a silver-colored contact face, the front and back of the contact are clearly distinguishable from each other so that there will be no danger of the wrong side of the contact being welded to its support, shown in dotted lines in FIG. 2. This highly desirable result is obtained by providing the solder with a copper-colored face 4 which will make it apparent to all concerned that that is the welding face of the contact. The copper color can be produced in different ways, such as by plating the solder with a film of copper or by spraying a film of copper onto the solder.

Since the weldable side of the contact is readily discernable due to the color contrast between the copper and silver faces of the contact, there is no danger of the wrong side being welded to a support, which would produce a defective connection and thereby permit the contact to break loose. Another advantage of this invention is that the copper face of the contact provides a more wettable and flowable surface for the welding operation, thereby promoting a better weld.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A weldable electric contact comprising a body having a silver-colored contact face and a back, and a layer of silver solder containing copper united with said back and having a copper-film welding face providing a more wettable and flowable surface for the welding operation, said faces also being clearly distinguishable from each other only by their colors, whereby the weldable side of the contact is readily discernable.

2. A weldable electric contact comprising a body having a silver-colored contact face and a back, and a layer of silver solder formed from an alloy of approximately 80 parts of copper and 15 parts of silver and 5 parts of phosphorous, the solder being united with said back and provided with a welding face formed by a copper film providing a more wettable and flowable surface for the welding operation, and said faces also being clearly distinguishable from each other only by their colors, whereby the weldable side of the contact is readily discernable.

References Cited by the Examiner
UNITED STATES PATENTS
3,078,562   2/63   Gwyn _____ 29—504

BERNARD A. GILHEANY, *Primary Examiner.*